United States Patent Office 3,585,115
Patented June 15, 1971

3,585,115
PROCESS FOR ELECTROWINNING SELENIUM
Walter B. Davis, deceased, late of Conover, N.C., by Ruth B. Davis, executrix, R.F.D. 2, Box 150, Conover, N.C. 28613
No Drawing. Filed June 6, 1969, Ser. No. 832,041
Int. Cl. C01b 19/00
U.S. Cl. 204—128                           15 Claims

ABSTRACT OF THE DISCLOSURE

When the perparation of an electrolyte from which selenium is to be recovered includes the step of adding boric acid and digesting at a moderately elevated temperature approximately 165° F. for about 30 minutes, the evolution of toxic gases is inhibited.

---

The presence of an aliphatic polyhydric amino alcohol greatly stabilizes the process and thereby increases the percentage of selenium recovered from an electrolyte containing selenities and selenates.

This invention relates to improvements in the electrowinning of the selenium content of copper-refinery anode slimes, sludges or muds, as variously referred to, or other bearing materials such as selenium dioxide, at low cost, with high efficiency, and without the evolution of toxic selenium gases.

This invention further relates to a method of preventing the evolution of toxic gases by a digest step employing boric acid and stabilizing the process by adidng a sufficient amount of an alkaline material to raise the pH approximately 7 or 8 or above.

Recovery of all or the greater part of selenium in selenium-bearing material by either electrolytic or chemical processes has proved difficult and/or unsatisfactory for commercial purposes for various reasons.

In prior art, for instance, both anodic and cathodic processes for the electrolytic recovery of selenium have encountered many disadvantages such as high cost in comparison with the percentage of selenium recovered, blocking of the diaphragm by sludge formed during electrolysis, criticalities of temperature, concentrations, current densities, valance states of the selenium ions, electrode composition, electrode pretreatment, and the evolution of toxic selenic gases. Hydrogen selenide, the most commonly formed, is extremely toxic and therefore a health hazard. These disadvantages are brought out in the following U.S. Pats.: 2,486,464, issued to C. M. Clark et al.; 2,583,799, issued to J. H. Schloen et al.; 2,414,438, issued to M. C. Bloom; 2,649,438, issued to A. von Hippel et al.; 2,834,652, issued to M. C. Hollander; and 2,863,731, issued to C. B. Porter et al. The electrolytic process of my invention mostly eliminates or substantially reduces the number and effect of the above disadvantages and others inherent in the art.

So far as is known to me no satisfactory method has been advanced for the electrolytic recovery of the selenium values in the leach water resulting from the treatment of the copper-refinery anode slimes, sludges or muds.

The basic electrolyte in my process is obtained in its least expensive form from a selenium-bearing copper-refinery anode slime resulting from the electrowinning of copper though it may be obtained from other selenium containing material such as selenium dioxide. For obvious reasons a slime of low copper assay but high selenium assay is preferred. The pretreatment of such a slime and the recovery of precious metals et cetera are well known in the art.

The selenium values of anode slimes are customarily made available in water soluble form by either roasting with sulfuric acid or soda ash (sodium carbonate), or modifications of these methods, and leaching with water. For economic reasons the soda roast is the preferred method. The latter is the method used in my invention.

Tellurium will codeposit with selenium at the cathode under alkaline conditions when present in concentrations greater than 50 gr./l. If present in excess thereof tellurium can be precipitated from the leach solution by adjusting the pH of the solution to about 6.0 to 6.8 with a strong acid such as sulfuric or hydrochloric and the tellurium recovered as tellurium dioxide by filtration. This yields an aqueous solution or filtrate of alkali metal or earth metal salts of selenium complexes.

It is such a filtrate with its selenium values that is the base or root matter of my invention. When digested with boric acid and an alkaline material added it becomes the catholyte in a two-compartment cell. The most satisfactory anolyte has been found to be a water solution of NaOH proportioned to reach the pH of the catholyte or slightly higher.

The particular selenium complex is not critical and comparative results have been obtained with selenities and selenates and a mixture of selenites and selenates. Concentrations of the selenium complex ions are not critical and may vary from 2 weight percent to saturation. In catholytes containing about 3–15 percent of the selenium-complex ions recovery of selenium will be in the order of 70% to 80% or better by weight of the available selenium.

The inhibition of toxic selenic gases is a very important consideration. For instance, the highly toxic hydrogen selenide is not only an extreme health hazard but it is also responsible for a decrease in the amount of selenium recovered. It has been discovered such gases can be eliminated as will now be described.

When solutions of selenium complexes are subjected to alkaline treatment to convert to salts of selenites and selenates, there will be intermixed a certain percentage of selenides. According to the invention any selenides present in the solution may be converted to selenites and selenates by adding an excess of boric acid, and digesting at an elevated temperature of 160° F. to 180° F. for about 30 minutes.

Selenium can be recovered from such a boric acid digested solution under a wide variety of electrolizing conditions. The character of the recovery will be determined primarily by the temperature of the electrolytes and the current density at the cathode. It has been found also such recovery may be conducted under normal lighting conditions.

It should be pointed out that in none of the various forms of recovery from the electrolytes subjected to the boric acid digest step in the preparation for the electrolytic process did any detectable evolution of a toxic selenic gas occur either at the cathode or the anode. For instance, by the foregoing procedure, according to my process, when the formation of selenic acid or its compounds is inhibited, the greater part of the selenium (80% plus) is recovered at the cathode in the elemental state. Any selenium anions in the negative valance that may enter the anolyte from any source of contamination may be recovered at the anode.

Another feature of the present invention is the discovery that the addition of an aliphatic polyhydric amino alcohol greatly stabilizes the solution during the electrolytic selenium recovery process. Aliphatic polyhyric amino alcohols suitable for practicing the present invention are those having 3 to 5 carbon atoms such as, 2-amino-2-methyl-1,3-propanediol; 2-amino-1,3-propanol; 2-amino- 2 - ethyl - 1,3 - propanediol; tris-hydroxymethyl)aminomethane; and 2-amino-2-hydroxyethyl-1,3-propanediol.

The exact concentration of the amino polyhydric alcohol is not critical. The specific amount is generally determined by the final pH of the catholyte. Although low concentrations, in the order of about 1 ounce per gallon are sufficient, the preferred concentrations are those sufficient to adjust the pH to about 8 or 12 and generally are in the order of about 3 to 10 ounces per gallon of catholyte. The pH of the catholyte is not particularly critical although an alkaline condition is preferred and best results have been obtained within a range of 8 to 9. The pH is usually adjusted by adding the amount of amino polyhydric alcohol necessary to bring the solution to the desired pH although alkali metal or alkaline metal hydroxides may be used. It has been found, however, when the pH of the catholyte has been adjusted by the use of an amino polyhydric alcohol it will remain in adjustment longer and under more widely different conditions than when other additives are used.

The recovery, according to the present invention, is conducted in a conventional two-compartment cell in which the anode and cathode compartments are separated by a porous diaphragm. The diaphragm may be any suitable porous, electrolytically non-conducting material such as, for example, ceramic and alundum, an aluminum oxide material prepared by fusing bauxite. The composition of the electrodes is not critical to the practice of the present invention so long as the composition is non-reactive to the electrolyte. Suitable cathode materials include carbon, steel, copper, titanium, and aluminum but not excluding others; and suitable anode materials include lead, carbon, titanium, steel, iron, combinations thereof, and the like. Titanium is particularly suitable because of its relative chemical inactivity.

The recovery of selenium can be conducted in cells using a cathode-anode potential from about 1½ to 12 volts but generally range from 5 to 6 volts with amperage proportionate to the exposed area of the cathode, and temperatures ranging from room temperature to about 100° F.

The following examples are offered to illustrate several embodiments of the present invention but it is understood that such illustrations only illustrate and do not constitute a limitation upon the invention.

EXAMPLE I

Slime obtained from the anode cell of an electrolytic copper refinery process was roasted with an excess of soda ash to convert the selenium to sodium selenite and sodium selenate. The selenium complexes were dissolved by leaching with water. After filtration the pH of the filtrate was adjusted to about 6.5 with sulfuric acid to precipitate any tellurium as tellurium dioxide and the solution filtered to remove this sludge. This left a stock solution of selenium values from the copper refinery slime. An excess of boric acid was added to this leach solution, or filtrate, and the solution heated to 165° F. to 175° F. for 30 minutes to digest remaining selenides to selenites and selenates. The solution which had a pH of 6 was adjusted to a pH of 8 by the addition of NaOH and placed in the cathode compartment of a conventional diaphragm electrolytic cell. Using a sodium hydroxide solution having a pH of about 9 to 10 in the anode compartment, a good rate of precipitation of selenium in the cathode compartment was had at a potential of 4 to 5 volts with no evolution of toxic $H_2Se$. The precipitation continued until the selenium content had been exhausted.

EXAMPLE II

The solution was prepared and digested as in Example I above. The solution had a pH of about 6 and was adjusted to a pH of about 8 by the addition of 2-amino-2-methyl-1, 3-propanediol and placed in the cathode compartment of a conventional diaphragm cell. Using a 3% sodium hydroxide anolyte, a lead anode, a stainless steel cathode and operating at a temperature of approximately 100° F. a good coating of selenium was rapidly obtained at 8½ volts.

EXAMPLE III 6 ounces of selenium dioxide were dissolved in 1 gallon of water and the small amount of residue removed by filtration. Sodium carbonate was slowly added to the filtrate until no further reaction was noticeable. The pH of the solution which was 8 was adjusted to 6 by adding sulfuric acid and the solution filtered again. This was stock solution from $SeO_2$. Into 40 fluid ounces of this solution was mixed 2 weight ounces of boric acid and the solution digested for 30 minutes at 165° F. to 170° F. The pH was then found to be 6 and was adjusted to 8 by adding 2 ounces of 2-amino-2-methyl-1, 3-propanediol. This became the catholyte. The anolyte was 2 weight ounces of NaOH in 64 fluid ounces of $H_2O$. Using a lead anode and carbon cathode, voltage approximately 5 and temperatures ranging from 85° F. to 95° F., using same procedure as in Example I, precipitation was copius.

What I claim is:

1. In a process for recovering selenium electrolytically by depositing selenium on a cathode or precipitating selenium at a cathode from a selenium-bearing solution, the step of inhibiting the evolution of toxic selenious gases by digesting the solution with boric acid at an elevated temperature.

2. In the process according to claim 1 wherein the digest step is conducted at a temperature of from 160° F. to 180° F.

3. A process for recovering selenium electrolytically at a cathode from a solution prepared by treatment of slime produced at the anode during electrowinning of copper, said treatment comprising the steps of roasting the slime with sodium carbonate, leaching the resultant slag with water, precipitating and separating the impurities including tellurium, inhibiting the evolution of selenious gases by digesting the filtered leach solution with boric acid at an elevated temperature, filtering to remove solid residue, adjusting the pH to 8 or 9 by the addition of an alkaline material and electrolytically recovering the selenium.

4. The process according to claim 3 wherein said electrolytic recovery is conducted at a potential of 1½ to 12 volts between the anode and the cathode.

5. The process according to claim 3 wherein said electrolytic recovery is conducted at a potential of 4½ to 6 volts between the anode and the cathode.

6. The process according to claim 3 wherein the material added is an aliphatic polyhydric alcohol having 3 to 5 carbon atoms.

7. The process according to claim 6 wherein the cathode is a material selected from a group consisting of carbon, steel, iron, copper, titanium, aluminum and combinations thereof, the anode is a material which is non-reactive to the anolyte and the electrolytic recovery is conducted in a cell having an anode and cathode compartment separated by a porous non-conducting diaphragm.

8. The process of recovering selenium from an electrolyte prepared according to claim 3 wherein the electrolyte forms the catholyte in a two-compartment cell.

9. The process for recovering selenium which comprises electrolytically precipitating selenium at the cathode from the catholyte of claim 8 which has been adjusted to a pH of about 8 and a temperature of about 72° F. and is conducted at a potential of about 3½ to 6 volts.

10. The process for recovering selenium which comprises electrolytically depositing selenium on the cathode from the catholyte of claim 8 which has been adjusted to a pH of from 9 to 12 and a temperature of about 100° F. and is conducted at a potential of from 6 to 12 volts.

11. The process for recovering selenium according to claim 8 wherein the anolyte is an alkaline solution of sodium hydroxide or sodium carbonate.

12. In the process according to claim 8 wherein the catholyte solution has a pH of about 8 or 9.

13. The process according to claim 8 wherein the catholyte is an aqueous solution of selenium complexes and an aliphatic amino polyhydric alcohol which is 2-amino-2-methyl-1, 3-propanediol.

14. The catholyte of claim 13 wherein said solution contains from about 5 to about 25 weight percent selenium complexes, from about 1 to about 10 weight percent 2-amino-2-methyl-1, 3-propanediol and has a pH of about 8 or 9.

15. The catholyte of claim 13 wherein the aliphatic polyhydric amino alcohol is used to adjust the pH of the solution.

References Cited
UNITED STATES PATENTS

| | | | |
|---|---|---|---|
| 2,834,652 | 5/1958 | Hollander et al. | 204—106 |
| 1,979,229 | 10/1934 | Pitzer | 204—108 |

HOWARD S. WILLIAMS, Primary Examiner

R. L. ANDREWS, Assistant Examiner